(12) United States Patent
Yang et al.

(10) Patent No.: US 11,087,666 B2
(45) Date of Patent: Aug. 10, 2021

(54) 3D DISPLAY SUBSTRATE, 3D DISPLAY DEVICE AND DISPLAY METHOD

(71) Applicant: BOE TECHNOLOGY GROUP CO., LTD., Beijing (CN)

(72) Inventors: Song Yang, Beijing (CN); Yanliu Sun, Beijing (CN); Xue Dong, Beijing (CN); Ming Zhu, Beijing (CN); Ge Shi, Beijing (CN); Shiyu Zhang, Beijing (CN); Yujie Liu, Beijing (CN); Yuyao Wang, Beijing (CN); Jiahui Han, Beijing (CN); Zheng Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,529

(22) Filed: Mar. 20, 2020

(65) Prior Publication Data
US 2021/0158740 A1 May 27, 2021

(30) Foreign Application Priority Data
Nov. 26, 2019 (CN) .......................... 201911172768.6

(51) Int. Cl.
*G09G 3/20* (2006.01)
*G02B 30/22* (2020.01)

(52) U.S. Cl.
CPC ........... *G09G 3/2003* (2013.01); *G02B 30/22* (2020.01); *G09G 2310/027* (2013.01); *G09G 2320/028* (2013.01); *G09G 2320/0209* (2013.01)

(58) Field of Classification Search
CPC . G06F 3/0443; G06F 3/0446; H01L 51/5275; H01L 51/56; H01L 51/5253; H04N 13/32; H04N 13/376; H04N 13/398
See application file for complete search history.

(56) References Cited

U.S. PATENT DOCUMENTS

2006/0152931 A1* 7/2006 Holman ............. G02B 27/0994
362/297
2016/0249046 A1* 8/2016 Yang ...................... H04N 13/32
(Continued)

FOREIGN PATENT DOCUMENTS

| CN | 106507095 A | 3/2017 |
|---|---|---|
| CN | 107250897 A | 10/2017 |
| CN | 108139591 A | 6/2018 |

OTHER PUBLICATIONS

Office Action dated Apr. 6, 2021 in corresponding CN Application 201911172768.6 with English translation, 15 pages.

*Primary Examiner* — Nelson M Rosario
(74) *Attorney, Agent, or Firm* — Muncy, Geissler, Olds and Lowe, P.C.

(57) ABSTRACT

The present disclosure provides a 3D display substrate including: a plurality of sub-pixels of different colors, a driver and a plurality of plano-convex lenses located at a light-emitting side of the plurality of sub-pixels. The plurality of sub-pixels are corresponding to the plurality of plano-convex lenses in a one-to-one manner. A light-emitting surface of each of the plurality of sub-pixels is located in a focal plane of the corresponding plano-convex lens. Each of the plurality of sub-pixels includes a plurality of sub-pixel sub-portions arranged in an array. The driver is configured to drive the plurality of sub-pixel sub-portions in the same sub-pixel to display images of different grayscales to form a 3D display image.

10 Claims, 4 Drawing Sheets

(56) References Cited

U.S. PATENT DOCUMENTS

| | | |
|---|---|---|
| 2017/0069877 A1* | 3/2017 | Tian ................... G02B 5/045 |
| 2018/0011332 A1 | 1/2018 | Vdovin et al. |
| 2018/0252932 A1 | 9/2018 | Tan et al. |
| 2018/0302613 A1 | 10/2018 | Chen |

* cited by examiner

3D DISPLAY SUBSTRATE, 3D DISPLAY DEVICE AND DISPLAY METHOD

CROSS-REFERENCE TO RELATED APPLICATION

This application claims the benefit and priority of Chinese Application No. 201911172768.6, filed on Nov. 26, 2019, which is incorporated herein by reference in its entirety.

TECHNICAL FIELD

The present disclosure relates to the field of display product manufacturing technologies, and in particular to a 3D display substrate, a 3D display device and a display method.

BACKGROUND

With further development and promotion of 5G, cloud computing, big data and other technologies, new flat-panel display technologies with large amount of information, high resolution, multi-dimensional and multi-shape, are also booming, for example, display technologies such as organic light-emitting diode (OLED), Quantum Dot Light Emitting Diodes (QLED) and Micro-LED have emerged and expanded rapidly. However, over the years, 3D display technology is still concentrated in Liquid Crystal Display (LCD) panel display, and 3D display based on OLED is very few. According to the statistics from 2010 to 2018, it is found that the listed brands of 3D display products (except 2013) and the shipments have been increasing, and the market demand is strong. However, the current application of 3D display technology on Mobile still has defects such as low pixels per inch (PPI), small amount of information (few views) and small 3D viewing angles.

SUMMARY

One embodiment of the present disclosure provides a 3D display substrate including: a plurality of sub-pixels of different colors; a driver; and a plurality of plano-convex lenses located at a light-emitting side of the plurality of sub-pixels. The plurality of sub-pixels are corresponding to the plurality of plano-convex lenses in a one-to-one manner. A light-emitting surface of each of the plurality of sub-pixels is located in a focal plane of the corresponding plano-convex lens. Each of the plurality of sub-pixels includes a plurality of sub-pixel sub-portions arranged in an array. The driver is configured to drive the plurality of sub-pixel sub-portions in the same sub-pixel to display images of different grayscales to form a 3D display image.

Optionally, the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner.

Optionally, the first electrode regions of the plurality of sub-pixel sub-portions of the same sub-pixel are insulated from each other and independent of each other; light-emitting layers of the plurality of sub-pixel sub-portions of the same sub-pixel are an integrated structure.

Optionally, the driver includes a sub-driver configured to independently drive each of the plurality of sub-pixel sub-portions.

Optionally, the driver is further configured to drive the plurality of sub-pixel sub-portions to display images of the same grayscale, thereby displaying a 2D image; the 3D display substrate further includes a switcher configured to control an operation state of the driver, thereby switching between 3D display and 2D display.

Optionally, the plurality of sub-pixels include a red sub-pixel, a green sub-pixel and a blue sub-pixel.

Optionally, each of the plurality of plano-convex lenses is a monochromatic lens having the same color as the sub-pixel that is corresponding to the each of the plurality of plano-convex lenses.

Optionally, the 3D display substrate further includes a circular polarizer that blocks external ambient light disposed between the plurality of plano-convex lenses and the plurality of sub-pixels.

One embodiment of the present disclosure further provides a 3D display device including: a 3D display substrate. The 3D display substrate includes: a plurality of sub-pixels of different colors; a driver; and a plurality of plano-convex lenses located at a light-emitting side of the plurality of sub-pixels. The plurality of sub-pixels are corresponding to the plurality of plano-convex lenses in a one-to-one manner; a light-emitting surface of each of the plurality of sub-pixels is located in a focal plane of the corresponding plano-convex lens; each of the plurality of sub-pixels includes a plurality of sub-pixel sub-portions arranged in an array. The driver is configured to drive the plurality of sub-pixel sub-portions in the same sub-pixel to display images of different grayscales to form a 3D display image.

Optionally, the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner.

Optionally, the first electrode regions of the plurality of sub-pixel sub-portions of the same sub-pixel are insulated from each other and independent of each other; light-emitting layers of the plurality of sub-pixel sub-portions of the same sub-pixel are an integrated structure.

One embodiment of the present disclosure further provides a display method, which is applied to the above 3D display device, including: controlling the driver to switch between a first state and a second state; in the first state, driving, by the driver, the plurality of sub-pixel sub-portions to display images of different grayscales, thereby forming a 3D image; in the second state, driving, by the driver, the plurality of sub-pixel sub-portions to display images of the same grayscale, thereby forming a 2D image.

Optionally, the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner; in the first state, driving, by the driver, the plurality of sub-pixel sub-portions to display images of different grayscales, thereby forming a 3D image, includes: independently adjusting grayscale of each sub-pixel sub-portion corresponding to each first electrode region by independently driving each first electrode region.

Optionally, in the second state, driving, by the driver, the plurality of sub-pixel sub-portions to display images of the same grayscale, thereby forming a 2D image, includes: independently adjusting grayscale of each sub-pixel sub-portion corresponding to each first electrode region by independently driving each first electrode region.

BRIEF DESCRIPTION OF THE DRAWINGS

In order to illustrate technical solutions according to embodiments of the present disclosure or in the related art more clearly, drawings to be used in the description of the embodiments or in the related art will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solution of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

In the description of the present disclosure, it should be noted that orientation and position relationships indicated by terms such as "center", "up", "down", "left", "right", "vertical", "horizontal", "inner", "outer", are based on orientation or position relationship shown in the drawings, and are merely used for convenience of description of the present disclosure and simplifying the description of the present disclosure, rather than indicating or implying that the referred device or element must have a specific orientation, be constructed and operated in a specific orientation, and thus cannot be construed as a limitation to the present disclosure. In addition, terms such as "first", "second" and "third" are used merely to distinguish similar objects and are not necessarily used to describe a particular order or sequence.

In view of the problem that the current application of 3D display technology on Mobile still has defects such as low pixels per inch (PPI), small amount of information (few views) and small 3D viewing angles, one embodiment of the present disclosure provides a 3D display substrate, in which one sub-pixel is divided into an array of multiple sub-pixel sub-portions and multiple plano-convex lenses corresponding to multiple sub-pixel sub-portions in a one-to-one manner. Multi-view 3D display is realized by adjusting grayscales of multiple sub-pixel sub-portions. Since division of the sub-pixel sub-portions is performed within each sub-pixel, original display resolution is not reduced, and 3D display with higher pixels per inch and larger amount of information can be realized as compared with other 3D display solutions.

Figure 1:
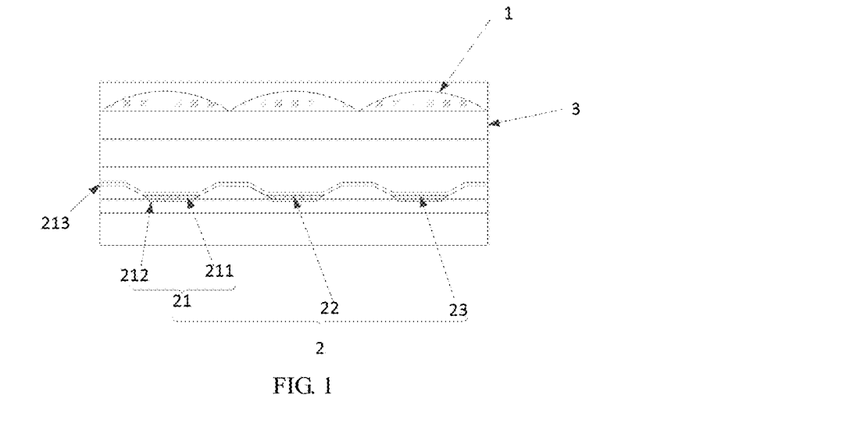
FIG. 1 is a schematic diagram of a display substrate according to an embodiment of the present disclosure.

Specifically, as shown in FIG. 1, one embodiment of the present disclosure provides a 3D display substrate, including multiple sub-pixels 2, a driver and multiple plano-convex lenses 1 located at a light-emitting side of the multiple plano-convex lenses 1.

The multiple sub-pixels 2 are corresponding to the multiple plano-convex lenses 1 in a one-to-one manner. A light-emitting surface of each sub-pixel 2 is located in a focal plane of the corresponding plano-convex lens 1. Each sub-pixel 2 includes multiple sub-pixel sub-portions arranged in an array.

The driver is configured to drive the multiple sub-pixel sub-portions to display images of different grayscales to form a 3D display image.

In this embodiment, a plane surface of the plano-convex lens 1 is oriented towards the sub-pixels.

The plano-convex lens has the following characteristics: a plane surface that passes through a first focal point (front focal point or object focal point) and is perpendicular to a main optical axis of the plano-convex lens, is referred as a first focal plane, also referred as a front focal plane or object focal plane; a plane surface that passes through a second focal point (back focal point or image focal point) and is perpendicular to the main optical axis of the plano-convex lens, is referred as a second focal plane, also referred as a back focal plane or image focal plane; light rays emitted from a point in the first focal plane (or directed to one point in the first focal plane) pass through an optical system (plano-convex lens) and then become a beam of parallel light rays having a fixed angle with respect to the main optical axis. The direction of the beam of parallel light rays is determined by a position of the light emitting point in the first focal plane. After the beam of parallel light rays having a fixed angle with respect to the main optical axis, passes through and emitted from the optical system, the emitted light rays (or their reverse extension lines) intersect at a certain point in the second focal plane. A position of this point in the second focal plane is determined by the direction of the incident beam of parallel light rays. The focal planes are not a pair of conjugate planes, and one plane surface that passes through one focal point and is perpendicular to the main optical axis of the plano-convex lens is referred as a focal plane.

In this embodiment, the above characteristics of the plano-convex lens are used. Based on the sub-pixel in the display panel, it is divided into m*n sub-pixel sub-portions arranged in an array. The plano-convex lens is provided at the light-emitting side of the sub-pixels. Positions of the sub-pixel sub-portions are in the focal plane of the plano-convex lens. Light rays emitted from each sub-pixel sub-portion are corresponding to a region of approximately collimated parallel light beam in the viewing space of the human eye. Since the multiple sub-pixel sub-portions emit light continuously, the formed parallel light beams continuously forms m*n 3D views (viewpoints), a viewer's left and right eyes respectively receive a view. By adjusting grayscales of the sub-pixel sub-portions, grayscales of various views are different. There is visual difference in the eyes, thereby forming a 3D effect. Since m*n 3D views (viewpoints) are formed, as the eyes move, the views are switched, thereby realizing multi-view 3D display function.

Since division of the sub-pixel sub-portions is performed within each sub-pixel, original display resolution is not reduced and then 3D display with higher pixels per inch and larger amount of information can be realized with lower color crosstalk between adjacent views, as compared with other 3D display solutions.

In this embodiment, the sub-pixel includes a light-emitting layer 211, a cathode 213 and an anode 212 on two sides of the light-emitting layer 211. The anode 212 includes multiple independent first electrode regions, thereby enabling each sub-pixel to include multiple sub-pixel sub-portions each including one first electrode region. In other words, in each sub-pixel, an region corresponding to the first electrode region defines one sub-pixel sub-portion. The multiple first electrode regions are independently controlled, thereby controlling light-emitting state of each sub-pixel sub-portion.

In this embodiment, the sub-pixels include, but not limited to, RGB sub-pixels. FIG. 1 shows RGB sub-pixels, which include a red sub-pixel 21, a green sub-pixel 22 and a blue sub-pixel 23.

FIG. 1 shows the one-to-one correspondence between the multiple sub-pixels 2 and the multiple plano-convex lenses 1. This is advantageous for making the plano-convex lens into a monochromatic lens, so that each plano-convex lens is corresponding to one sub-pixel of the same color as the each plano-convex lens. In this way, D/f (relative aperture) of the plano-convex lens can be greatly improved and then the 3D viewing angle is increased.

Figure 2:
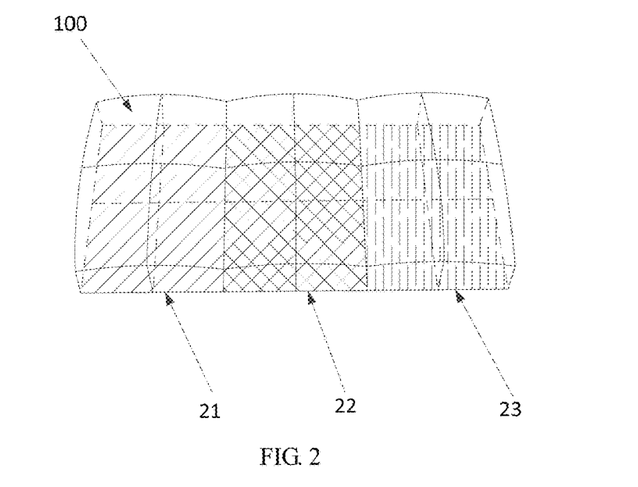
FIG. 2 is a schematic diagram of dividing a sub-pixel into multiple sub-pixel sub-portions according to an embodiment of the present disclosure.

The number of sub-pixel sub-portions into which one sub-pixel can be divided, may be set according to actual needs. FIG. 2 is a schematic diagram showing division of some sub-pixels. Each of the red sub-pixel 21, the green sub-pixel 22 and the blue sub-pixel 23 is divided into 4 sub-pixel sub-portions 100, which is not limited thereto.

It should be noted that each sub-pixel includes at least 2 sub-pixel sub-portions, and this can ensure that each sub-pixel at least includes two sub-pixel sub-portions for forming two viewpoints. One of the sub-pixel sub-portions forms a viewpoint entering the left eye, and the other one of the sub-pixel sub-portions forms a viewpoint entering the right eye. For example, one sub-pixel includes three sub-pixel sub-portions which are labeled 1, 2, and 3, respectively, which can be divided into three sub-pixel sub-portion groups each forming stereo views entering the left and right eyes. Specifically, the first sub-pixel sub-portion group includes the sub-pixel sub-portion labeled 1 and the sub-pixel sub-portion labeled 2; the second sub-pixel sub-portion group includes the sub-pixel sub-portion labeled 2 and the sub-pixel sub-portion labeled 3; and the third sub-pixel sub-portion group includes the sub-pixel sub-portion labeled 1 and the sub-pixel sub-portion labeled 3. When the position of the viewer relative to a display panel is varied, views formed by different sub-pixel sub-portion groups can be received. By adjusting views entering the left and right eyes, the left and right eyes receive parallax images, thereby viewing a 3D image.

Figure 3:
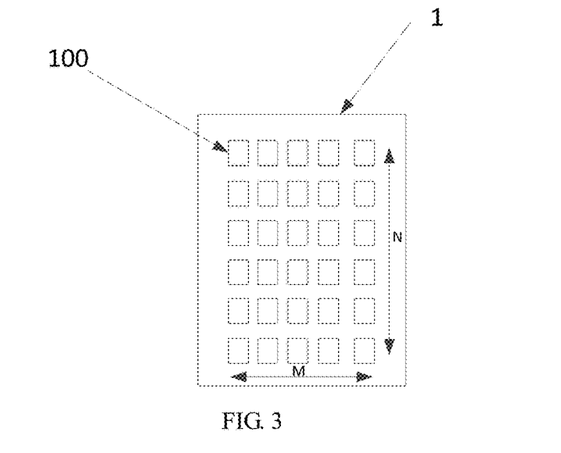
FIG. 3 is a schematic diagram of distribution of multiple sub-pixel sub-portions according to an embodiment of the present disclosure.
Figure 4:
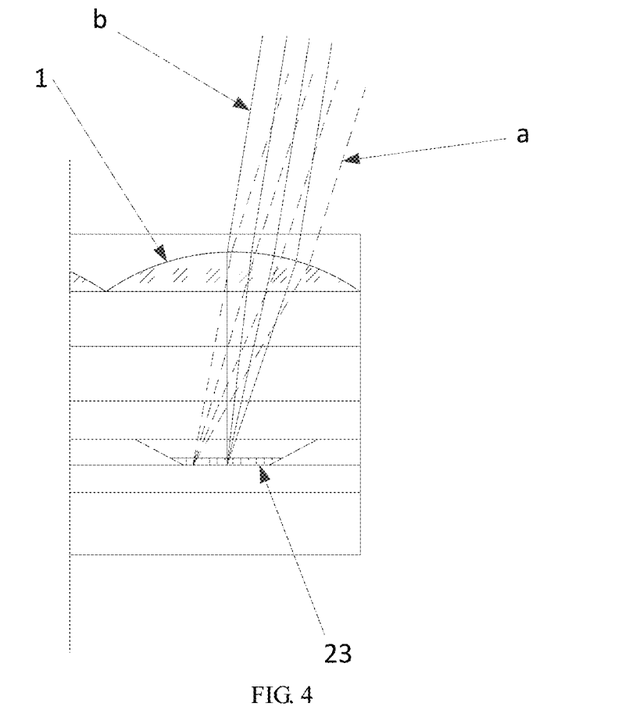
FIG. 4 is a schematic diagram showing paths of light emitted by a sub-pixel sub-portion through a plano-convex lens according to an embodiment of the present disclosure.
Figure 5:
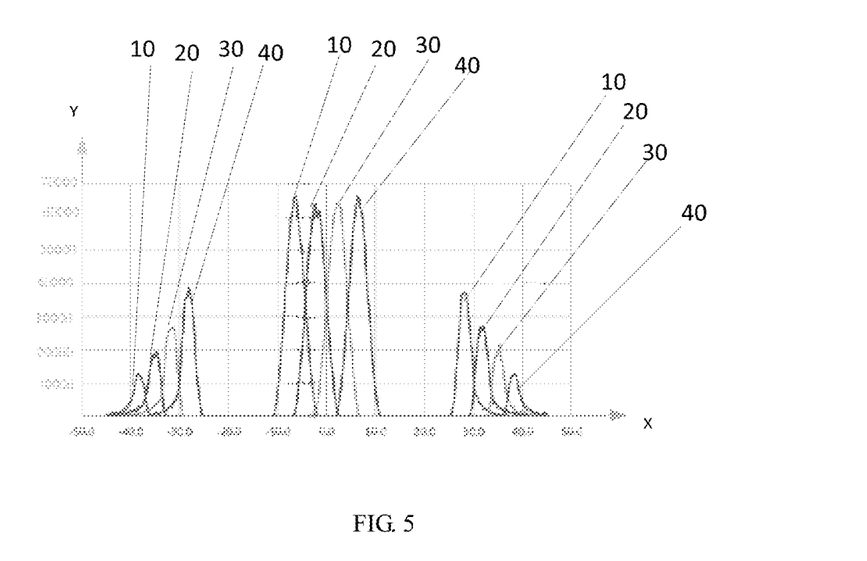
FIG. 5 is a schematic diagram showing distribution curves of views when a light-emitting surface of a sub-pixel sub-portion is 19 um from a focal plane according to an embodiment of the present disclosure.
Figure 6:
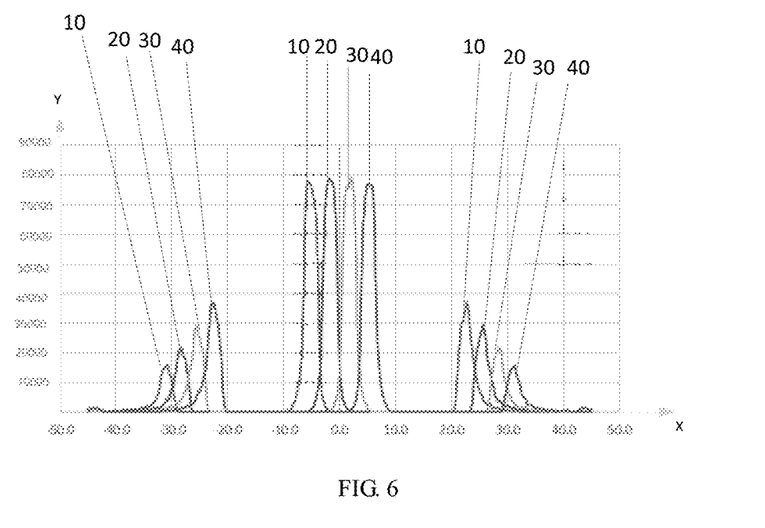
FIG. 6 is a schematic diagram showing distribution curves of views when a light-emitting surface of a sub-pixel sub-portion is in a focal plane according to an embodiment of the present disclosure.

A light-emitting area of the sub-pixel is subdivided into m*n sub-pixel sub-portions. As shown in FIG. 3, since the light-emitting surface of each sub-pixel sub-portion is in the focal plane of the plano-convex lens 1, each sub-pixel sub-portion has its own independent projection region in space, as shown in FIG. 4; at this point, projected light beams are approximately parallel light beams and then crosstalk is the smallest, as shown in FIG. 5 and FIG. 6. FIG. 5 shows distribution curves of views when the light-emitting surface of the sub-pixel sub-portion is 19 um from the focal plane of the plano-convex lens. FIG. 6 shows distribution curves of views when the light-emitting surface of the sub-pixel sub-portion is in the focal plane of the plano-convex lens.

In this embodiment, the driver is further configured to drive the multiple sub-pixel sub-portions to display images of the same grayscale, thereby displaying a 2D image. A switcher is further included. The switcher is configured to control an operation state of the driver, thereby switching between 3D display and 2D display.

According to the above technical solution, the driver can adjust grayscales of the multiple sub-pixel sub-portions, so that the various sub-pixel sub-portions display different grayscales (the grayscale of the sub-pixel sub-portion for forming the view entering the left eye is different from the grayscale of the sub-pixel sub-portion for forming the view entering the right eye), thereby achieving 3D display effect. When the various sub-pixel sub-portions display the same grayscale, 2D display effect can be achieved. In this way, the viewer can choose according to his own viewing needs, thereby improving user experience.

In this embodiment, the driver includes a sub-driver for independently driving each sub-pixel sub-portion.

Figure 7:
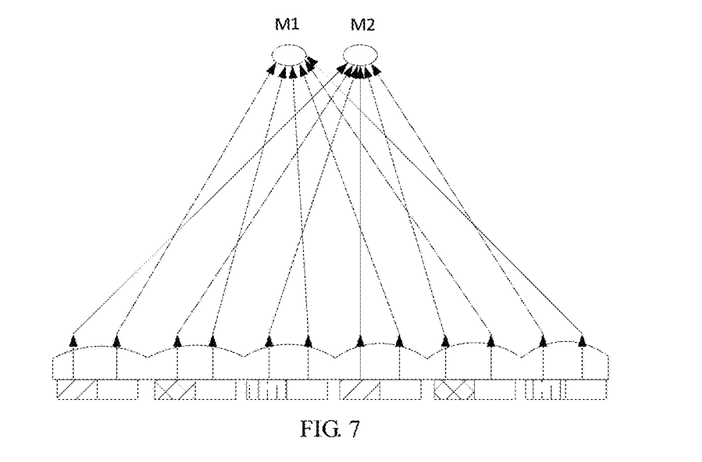
FIG. 7 is a schematic diagram showing images of different grayscales received by the eyes according to an embodiment of the present disclosure.
Figure 8:
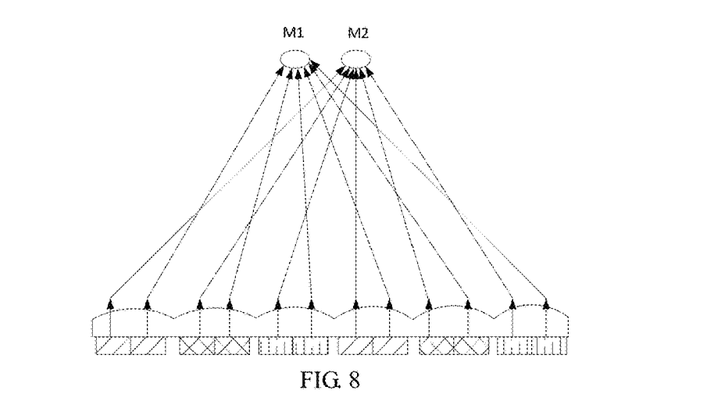
FIG. 8 is a schematic diagram showing images of identical grayscales received by the eyes according to an embodiment of the present disclosure.

By independently driving each first electrode region, each sub-pixel sub-portion can be independently driven, thereby independently adjusting the grayscale of each sub-pixel sub-portion, which is more flexible and convenient. The single sub-pixel sub-portion is independently driven to emit light. When the sub-pixel sub-portion for forming the view entering the left eye and the sub-pixel sub-portion for forming the view entering the right eye display different grayscales, the two eyes receive different parallax images, thereby achieving 3D display effect, as shown in FIG. 7. When the sub-pixel sub-portions display the same grayscale, the two eyes receive the same image, thereby forming a normal 2D vision, as shown in FIG. 8.

In this embodiment, the first electrode regions of the multiple sub-pixel sub-portions of the same sub-pixel are insulated from each other and independent of each other. Further, light-emitting layers of the multiple sub-pixel sub-portions of the same sub-pixel are an integrated structure, that is, the light-emitting surfaces of the multiple sub-pixel sub-portions of the same sub-pixel are continuous.

Figure 9:
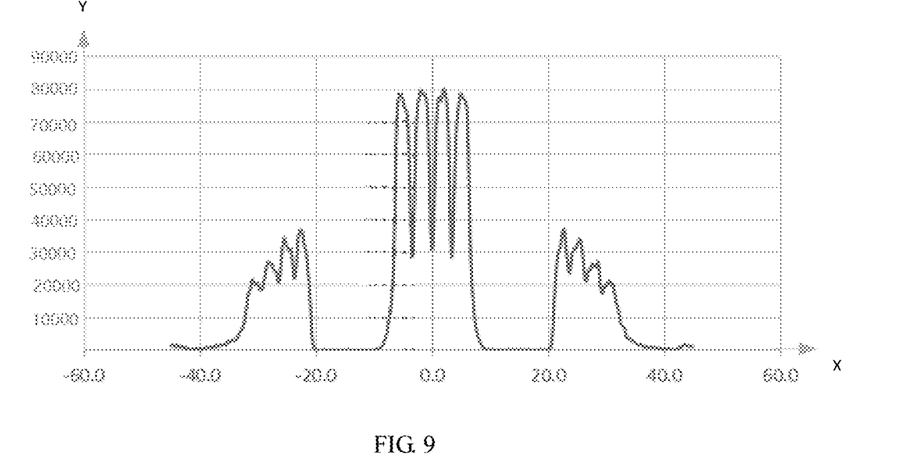
FIG. 9 is a schematic diagram showing distribution curves of views when there is a gap between light emitting surfaces of sub-pixel sub-portions according to an embodiment of the present disclosure.
Figure 10:
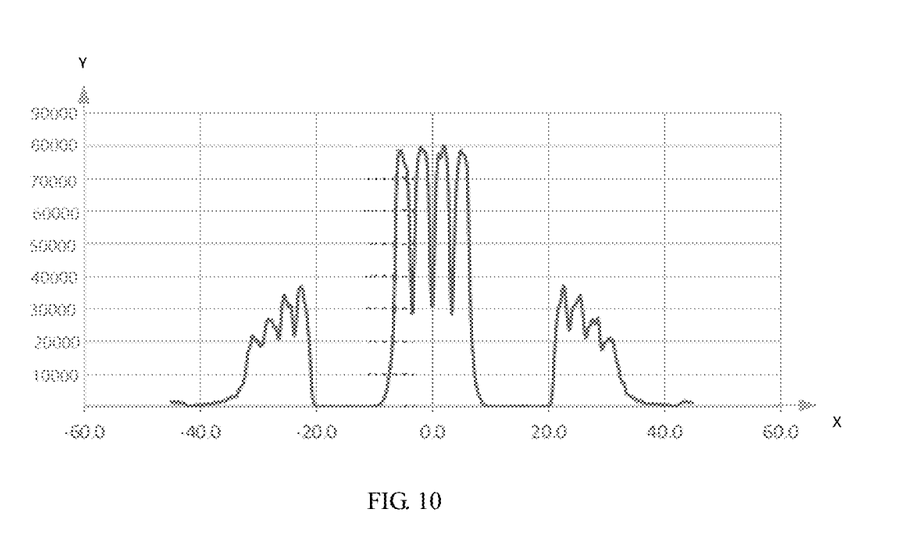
FIG. 10 is a schematic diagram showing distribution curves of views when there is no gap between light emitting surfaces of sub-pixel sub-portions according to an embodiment of the present disclosure.

If there is a gap between the light-emitting surfaces of the multiple sub-pixel sub-portions of the same sub-pixel, the gap will be projected into a small black area in space. The macro effect of the black areas on edges of all the sub-pixel sub-portions of the entire screen is 3D Moire. When various views display 255 grayscale at the same time, i.e., when a 2D display is formed, the moire will appear, as shown in FIG. 9. In view of this, light rays emitted from multiple sub-pixel sub-portions in the same sub-pixel are as continuous as possible. When the gap between the light-emitting surfaces of the multiple sub-pixel sub-portions of the same sub-pixel is close to 0, the moire phenomenon in 2D display can be eliminated, as shown in FIG. 10. In other words, when the light-emitting layers of the multiple sub-pixel sub-portions of the same sub-pixel are an integrated structure, light rays emitted from the multiple sub-pixel sub-portions in the same sub-pixel are continuous. In this way, multiple parallel light regions formed by light rays which are emitted from the multiple sub-pixel sub-portions in the same sub-pixel and pass through the corresponding plano-convex lens, are continuous, so that multiple views formed by the multiple sub-pixel sub-portions are continuous.

It should be noted that in order to ensure that the light-emitting layers of two adjacent sub-pixel sub-portions in the same sub-pixel are an integrated structure, i.e., ensuring that the light-emitting surfaces of multiple sub-pixel sub-portions in the same sub-pixel are continuous, while ensuring that the first electrode regions of multiple sub-pixel sub-portions in the same sub-pixel are insulated from each other and independent of each other, the following two implementation manner are adopted in this embodiment.

In the first implementation manner, when two adjacent sub-pixel sub-portions of the same sub-pixel are in the same plane, two adjacent sub-pixel sub-portions of the same sub-pixel may be formed into independent patterns through the etching process.

In the second implementation manner, two adjacent sub-pixel sub-portions of the same sub-pixel may be realized by segment difference, that is, the first electrode regions of two adjacent sub-pixel sub-portions of the same sub-pixel are formed on two planes with segment difference.

In another implementation manner of this embodiment, the plano-convex lens is a monochromatic lens having the same color as the corresponding sub-pixel. In this way, D/f (relative aperture) of the plano-convex lens can be greatly improved and then the 3D viewing angle is increased.

In this embodiment, a circular polarizer that blocks external ambient light is disposed between the plano-convex lens and the sub-pixel.

The presence of the circular polarizer can block the external ambient light, thereby improving the contrast.

The display substrate may be any product or component having a display function, such as a liquid crystal television, a liquid crystal display device, a digital photo frame, a mobile phone, and a tablet computer. The display panel further includes a flexible circuit board, a printed circuit board and a backboard.

The present disclosure further provides a 3D display device, which includes the above 3D display substrate.

The advantages of this solution are as follows. By using the characteristics of the focal plane of the plano-convex lens, the sub-pixel are subdivided into multiple sub-pixel sub-portions arranged in an array; by adjusting the grayscales of the sub-pixel sub-portions and projecting images of multiple sub-pixel sub-portions into different regions in space, a multi-view and multi-angle continuous 3D display based on an OLED display (not limited to this) is formed. As the eyes move, different 3D views can be viewed. As the light-emitting surfaces of the sub-pixel sub-portions are in the focal plane of the plano-convex lens and continuous, the crosstalk between various views can be minimized, and the low crosstalk area in the view area can be maximized. By driving multiple sub-pixel sub-portions to display views of different grayscales or views of the same grayscale, switching between 3D display and 2D display can be realized. Light-emitting surfaces of M*N sub-pixel sub-portions corresponding to one plano-convex lens are as continuous as possible, thus the spatial projection is continuous, thereby eliminating the moire phenomenon. Since division of the sub-pixel sub-portions is performed within each sub-pixel, original display resolution is not reduced and then this solution can realize 3D display with higher pixels per inch and larger amount of information with lower color crosstalk between adjacent views, as compared with other 3D display solutions.

One embodiment further provides a display method, which is applied to the above 3D display device and includes:

controlling the driver to switch between a first state and a second state;

in the first state, the driver drives the multiple sub-pixel sub-portions to display images of different grayscales, thereby forming a 3D image;

in the second state, the driver drives the multiple sub-pixel sub-portions to display images of the same grayscale, thereby forming a 2D image.

Foregoing describes optional implementation modes of the present disclosure, but the protection scope of the present disclosure is not limited to this. For persons having ordinary skill in the art, several improvements and changes may be made, without departing from the principle of the present disclosure. These improvements and changes should also be within the scope of the present disclosure. Therefore, the protection scope of the present disclosure shall be subject to the protection scope of the claims.

What is claimed is:

1. A 3D display substrate comprising:
a plurality of sub-pixels of different colors;
a driver; and
a plurality of plano-convex lenses located at a light-emitting side of the plurality of sub-pixels;
wherein the plurality of sub-pixels are corresponding to the plurality of plano-convex lenses in a one-to-one manner; a light-emitting surface of each of the plurality of sub-pixels is located in a focal plane of the corresponding plano-convex lens; each of the plurality of sub-pixels includes a plurality of sub-pixel sub-portions arranged in an array;
the driver is configured to drive the plurality of sub-pixel sub-portions in the same sub-pixel to display images of different grayscales to form a 3D display image;
wherein the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner;
wherein the first electrode regions of the plurality of sub-pixel sub-portions of the same sub-pixel are insulated from each other and independent of each other; light-emitting layers of the plurality of sub-pixel sub-portions of the same sub-pixel are an integrated structure.

2. The 3D display substrate according to claim 1, wherein the driver includes a sub-driver configured to independently drive each of the plurality of sub-pixel sub-portions.

3. The 3D display substrate according to claim 1, wherein the driver is further configured to drive the plurality of sub-pixel sub-portions to display images of the same grayscale, thereby displaying a 2D image; the 3D display substrate further includes a switcher configured to control an operation state of the driver, thereby switching between 3D display and 2D display.

4. The 3D display substrate according to claim 1, wherein the plurality of sub-pixels include a red sub-pixel, a green sub-pixel and a blue sub-pixel.

5. The 3D display substrate according to claim 1, wherein each of the plurality of plano-convex lenses is a monochromatic lens having the same color as the sub-pixel that is corresponding to the each of the plurality of plano-convex lenses.

6. The 3D display substrate according to claim 1, further comprising a circular polarizer that blocks external ambient light disposed between the plurality of plano-convex lenses and the plurality of sub-pixels.

7. A 3D display device comprising:
a 3D display substrate;
wherein the 3D display substrate includes: a plurality of sub-pixels of different colors; a driver; and a plurality of plano-convex lenses located at a light-emitting side of the plurality of sub-pixels;
wherein the plurality of sub-pixels are corresponding to the plurality of plano-convex lenses in a one-to-one manner; a light-emitting surface of each of the plurality of sub-pixels is located in a focal plane of the corresponding plano-convex lens; each of the plurality of sub-pixels includes a plurality of sub-pixel sub-portions arranged in an array;
the driver is configured to drive the plurality of sub-pixel sub-portions in the same sub-pixel to display images of different grayscales to form a 3D display image;
wherein the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner;
wherein the first electrode regions of the plurality of sub-pixel sub-portions of the same sub-pixel are insulated from each other and independent of each other; light-emitting layers of the plurality of sub-pixel sub-portions of the same sub-pixel are an integrated structure.

8. A display method, which is applied to the 3D display device according to claim 7, comprising:
controlling the driver to switch between a first state and a second state;
in the first state, driving, by the driver, the plurality of sub-pixel sub-portions to display images of different grayscales, thereby forming a 3D image;
in the second state, driving, by the driver, the plurality of sub-pixel sub-portions to display images of the same grayscale, thereby forming a 2D image.

9. The display method according to claim 8, wherein the sub-pixel includes a light-emitting layer, a cathode and an anode on two sides of the light-emitting layer; the anode includes a plurality of independent first electrode regions; in the same sub-pixel, the plurality of independent first electrode regions are corresponding to the plurality of sub-pixel sub-portions in a one-to-one manner;
in the first state, driving, by the driver, the plurality of sub-pixel sub-portions to display images of different grayscales, thereby forming a 3D image, includes:
independently adjusting grayscale of each sub-pixel sub-portion corresponding to each first electrode region by independently driving each first electrode region.

10. The display method according to claim 9, wherein in the second state, driving, by the driver, the plurality of sub-pixel sub-portions to display images of the same grayscale, thereby forming a 2D image, includes:
independently adjusting grayscale of each sub-pixel sub-portion corresponding to each first electrode region by independently driving each first electrode region.

* * * * *